US010603754B2

(12) United States Patent
Witter et al.

(10) Patent No.: US 10,603,754 B2
(45) Date of Patent: Mar. 31, 2020

(54) UNIVERSAL-FIT VACUUM ASSISTED DUST COLLECTION HOOD FOR ROUTERS

(71) Applicants: Robert M Witter, Englewood, FL (US); Jeffrey Hill, Cicero, NY (US); Richard Lawrence, Syracuse, NY (US); John J Fitzsimmons, Clay, NY (US)

(72) Inventors: Robert M Witter, Englewood, FL (US); Jeffrey Hill, Cicero, NY (US); Richard Lawrence, Syracuse, NY (US); John J Fitzsimmons, Clay, NY (US)

(73) Assignee: Oneida Air Systems, Inc., Syracuse, NY (US)

( * ) Notice: Subject to any disclaimer, the term of this patent is extended or adjusted under 35 U.S.C. 154(b) by 275 days.

(21) Appl. No.: 15/670,085

(22) Filed: Aug. 7, 2017

(65) Prior Publication Data

US 2018/0056464 A1  Mar. 1, 2018

Related U.S. Application Data

(60) Provisional application No. 62/378,253, filed on Aug. 23, 2016.

(51) Int. Cl.
*B23Q 11/00* (2006.01)
*B27C 5/10* (2006.01)

(52) U.S. Cl.
CPC ...... *B23Q 11/0071* (2013.01); *B23Q 11/0046* (2013.01); *B27C 5/10* (2013.01)

(58) Field of Classification Search
CPC ............ B23Q 11/0042; B23Q 11/0046; B23Q 11/0071; B23C 1/20; B27C 5/04; B27C 5/10
See application file for complete search history.

(56) References Cited

U.S. PATENT DOCUMENTS

| 4,821,365 A | 4/1989 | Charters |
| 5,993,124 A | 11/1999 | Cooper et al. |
| 7,290,967 B2 * | 11/2007 | Steimel ............. B23Q 11/0046 144/252.1 |
| 8,079,389 B2 | 12/2011 | Shepherd |
| 2005/0180828 A1 | 8/2005 | Stiemel et al. |
| 2006/0191597 A1 | 8/2006 | Cooper et al. |
| 2006/0193706 A1 | 8/2006 | Waldron |
| 2010/0089497 A1 | 4/2010 | Keenan |
| 2013/0051951 A1 | 2/2013 | Friegang |

* cited by examiner

*Primary Examiner* — Matthew Katcoff
(74) *Attorney, Agent, or Firm* — Bernhard P. Molldrem, Jr.

(57) ABSTRACT

A universal-fit vacuum assisted router hood tool attaches to the router to capture dust and particles generated by the router bit. A generally planar base plate is adapted to mount to the flat base of the router. The base plate has a central opening centered on the axis of the router so that associated router bit protrudes through. A dust collection dome is rotationally positioned in the central opening, and the dome has a central opening at the axis of the router A cuff connector extending out from the dust collection dome to a hose cuff that can receive a hose of a dust extractor. An annular flange within the dome at the top opening prevents dust and particulates from exiting the top opening of the dome.

18 Claims, 11 Drawing Sheets

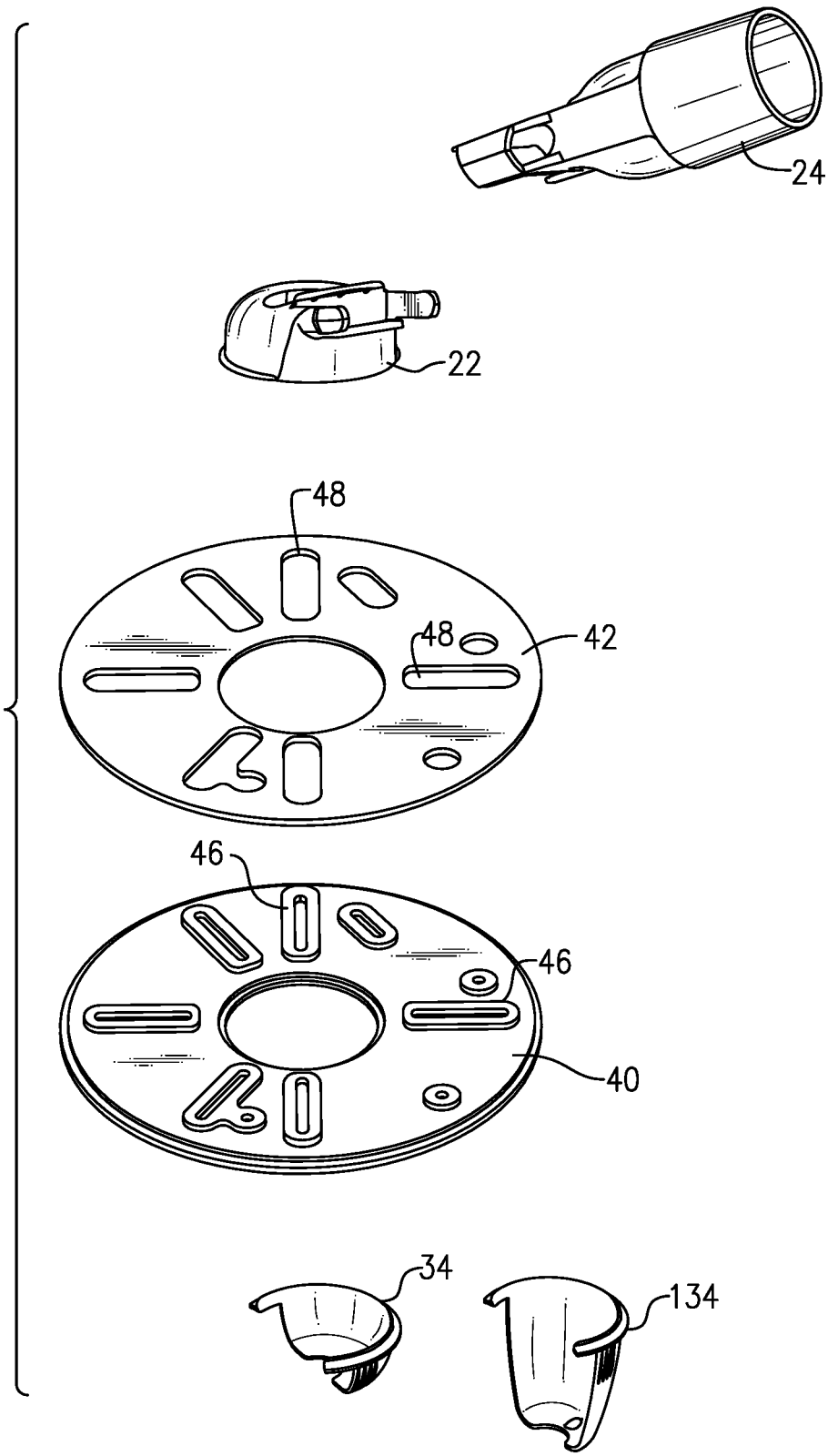

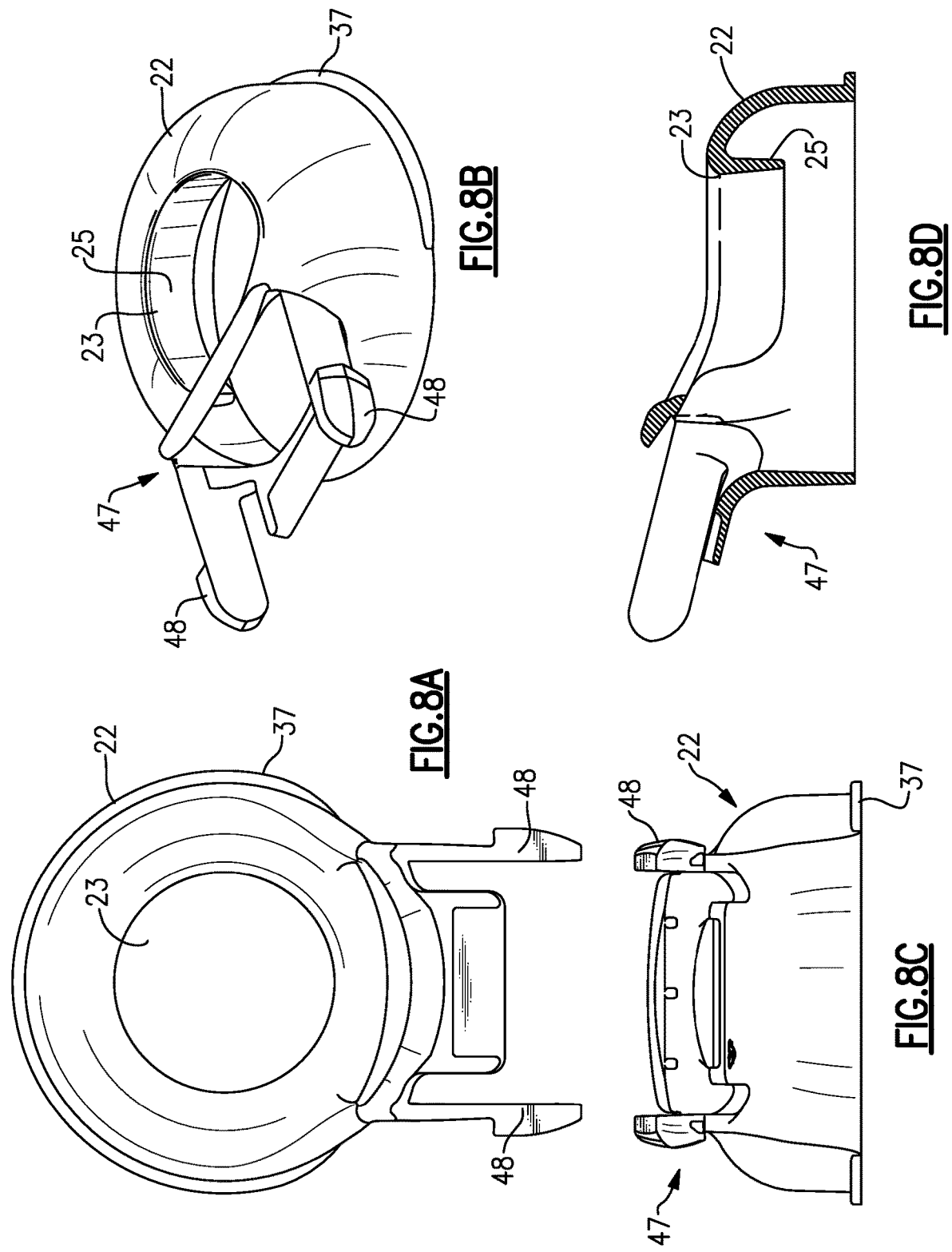

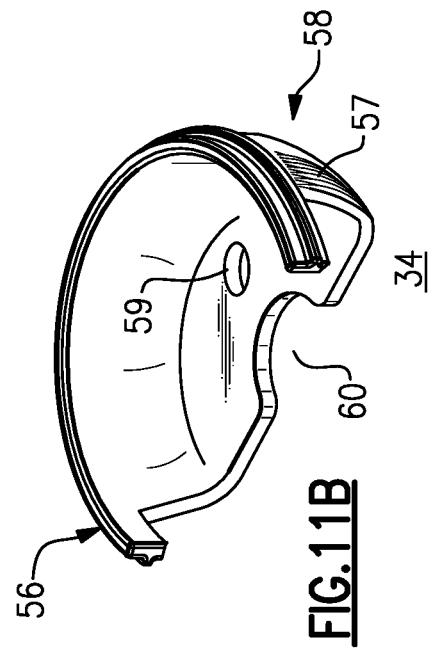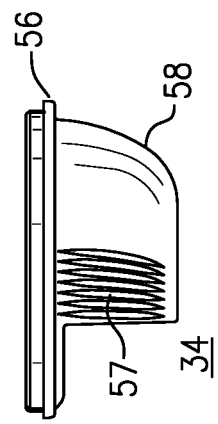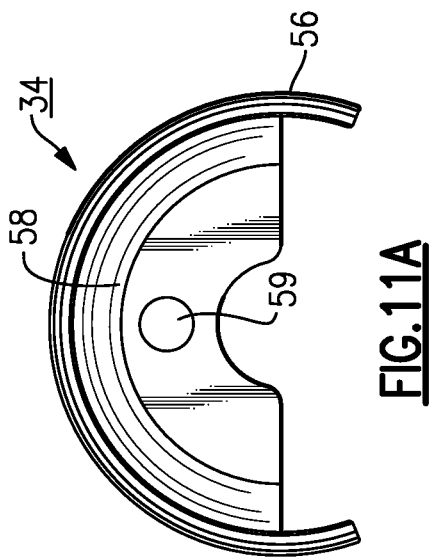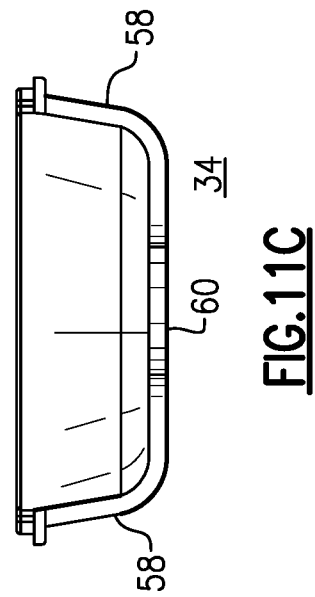
FIG.11B
FIG.11D
FIG.11A
FIG.11C

UNIVERSAL-FIT VACUUM ASSISTED DUST COLLECTION HOOD FOR ROUTERS

This application claims benefit under 35 U.S.C. 119(e) of Provisional Application Ser. No. 62/378,253, filed Aug. 23, 2016, the disclosure of which is incorporated by reference.

BACKGROUND OF THE INVENTION

This invention is directed to hand-held and/or portable router tools which operate with a high speed rotating bit attached to a motor and router body. The invention is more particularly concerned with a dust collection system to conduct process ducts and chips away from the router so that the dust and chips are drawn into a vacuum dust collection system. Routers are available in a large number of sizes, shapes, horsepower and intended use. The intended use of such routers is to cut-away material using a variety of sizes/shapes of cutting bits. Router bits rotate a sharp edge against the workpiece and remove material by the cutting action of the bit with each revolution. A consequence of this cutting action is that debris is removed from the workpiece and accelerated tangentially outward. Left unchecked, this debris projects outward where it generally falls to the ground or work-surface by gravity. Wood dust and finer debris may become airborne whereby it can contaminate the atmosphere in the work area or beyond.

Routers are a versatile tool because of their ability to accept a large variety of cutters and bits. They can adjust for ranges of cutting depths, aggressiveness of cuts or RPM range of their motors. Their designs and operations may allow them to "plunge cut" within the workpiece away from the edges, or to work along edges of material using bushings or bearings as guides. During cutting on an interior area of a workpiece debris may be channeled up into the center of the router base and then outward through side port(s). When cutting along a periphery of a workpiece dust may be channeled directly off of the cutting bit and thrown outward below the router base. Thus, routers may expel debris from above the base of the router, below the base of the router or from both locations.

Because of the wide operating range of use as described above, dust collection remains a challenge. In the workshop environment. Dust and debris are often seen shooting out at varying, odd angles, varying velocity and in varying amounts. The mounting location for effective dust collection equipment may at times need to be above or below the router base plate (or both).

Router manufacturers fail to consider dust collection or address dust collection as an afterthought. Routers make no provision for attaching a dust collection tool (vacuum hose, bag or other device). Few, if any, routers found on the market come with any such provision.

It is widely known in industries where routers are used that they are messy tools. The widely scattered debris created by router use has become a "norm" to their operators. At the same time, it has been desired to create an improved method for effectively collecting the dust and debris generated when using a routing tool.

OBJECTS AND SUMMARY OF THE INVENTION

Accordingly, a tool or attachment for collecting router-generated dust and debris should be of a straightforward design which provides for efficient debris collection, and which is adapted attachment to most or almost all router brands, models and sizes.

Therefore, it is a significant object to provide a router hood with improved efficiency of dust collection and for collecting chips and other debris resulting from the routing operation.

It is a more specific object for the router hood to have tool design to accept most or all router models, making it a universal-fit tool.

It is another object to design the router hood to allow for dust collection from above the router base plate, via a side portal in the router, into the hose of a shop vacuum or other dust extractor or dust collection system.

Another object is to provide modularity of design that allows the user a number of options for adapting to different vacuum hose connectors.

Yet another object is to provide the router hood such that it may be fastened to the base of the router and which does not impair the actual use of the router.

The universal fit router hood has a generally flat base plate that mounts onto the base of the router. The base plate has a central opening where a dust collection dome is rotationally positioned. A cuff connector extends from the dust collection dome to a hose cuff that receives a hose connection to a dust extractor. One or more dust chutes or chip chutes can be removably mounted on the base plate to channel dust from around the router bit up into the dome and cuff connector.

BRIEF DESCRIPTION OF THE DRAWING

FIG. 5 is a perspective assembly view of the router hood of this embodiment.

FIGS. 8A, 8B, 8C and 8D are a top plan view, perspective view, proximal elevation and side elevation of the dome of this embodiment.

FIGS. 11A, 11B, 11C and 11D are a top plan view, perspective, first side elevation and second side elevation of the small chip chute or shallow chip cover of this embodiment.

DESCRIPTION OF A PREFERRED EMBODIMENT OF THE INVENTION

Figure 1:
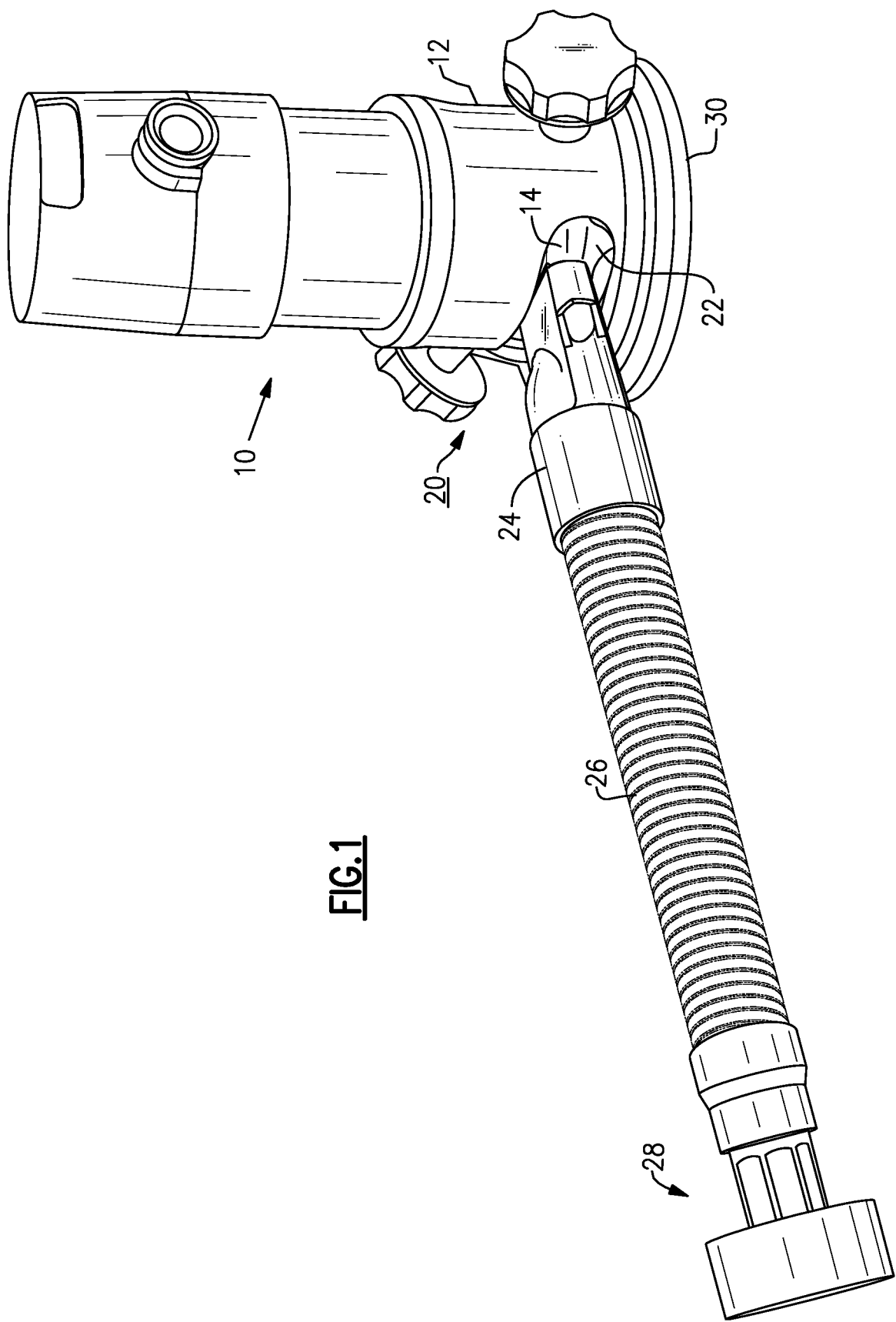
FIGS. 1 and 2 are side and front perspective views showing the router hood according to an embodiment of this invention in place on a router and fitted with a vacuum hose.
Figure 2:
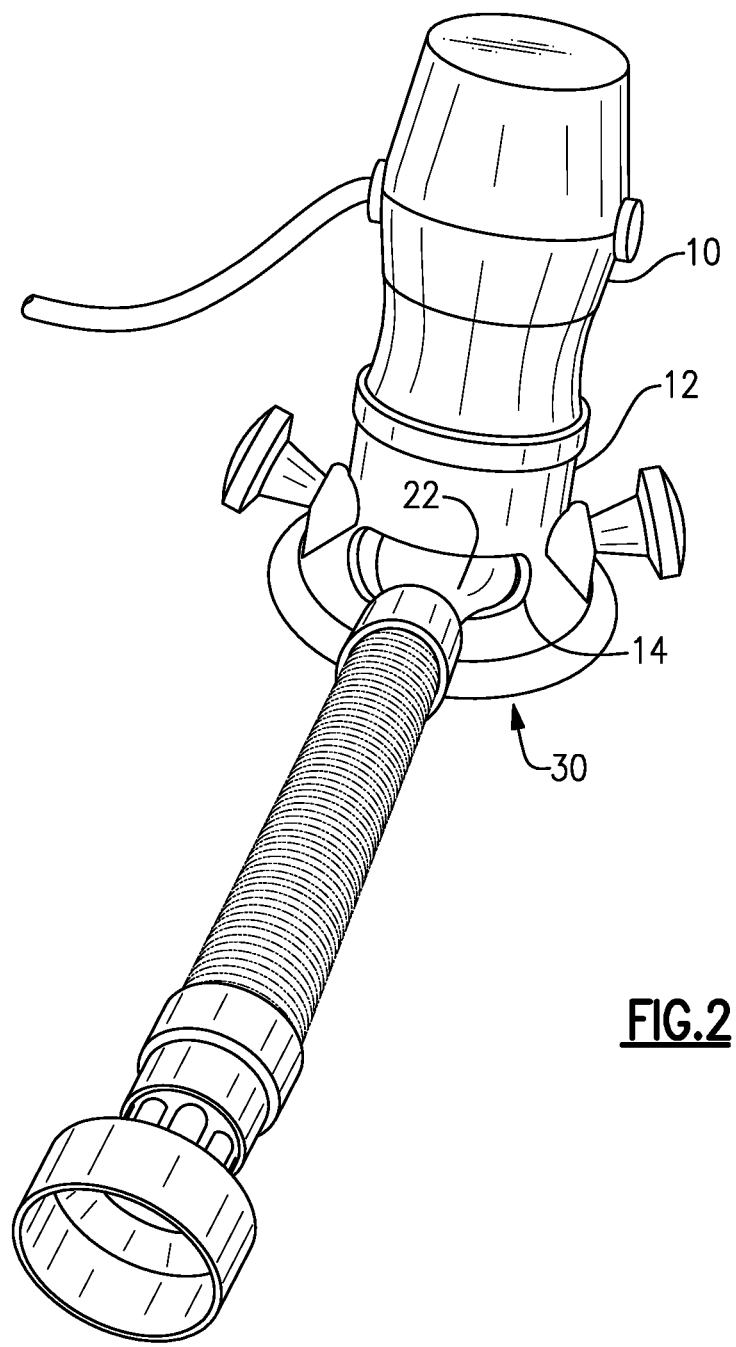

FIGS. 1 and 2 show a typical router 10 with a vertically positioned motor seated in a router base 12. A router bit (concealed here) driven by the motor extends down beneath the bottom surface of the router base so it can mill or cut away from the workpiece beneath the router base. There are one or more router vent openings or ports 14 on the sides of the router base and chips and process dust from the router can leave through these ports.

A Universal-fit vacuum assisted router hood tool 20 or dust collector attachment according to an embodiment of this invention has dust collector dome 22 positioned within the router base 12 with a discharge cuff 24 extending out through one of the router vents or ports 14, and this is joined to a flexible vacuum hose 26. The hose has an adapter connector 28 at its other end to connect to an intake nozzle of a shop vacuum cleaner or other similar dust extractor apparatus (not shown here). The cuff 24 has a quick-disconnect fitting so that it does not jut out from the router body and risk damage during transport.

Figure 3:
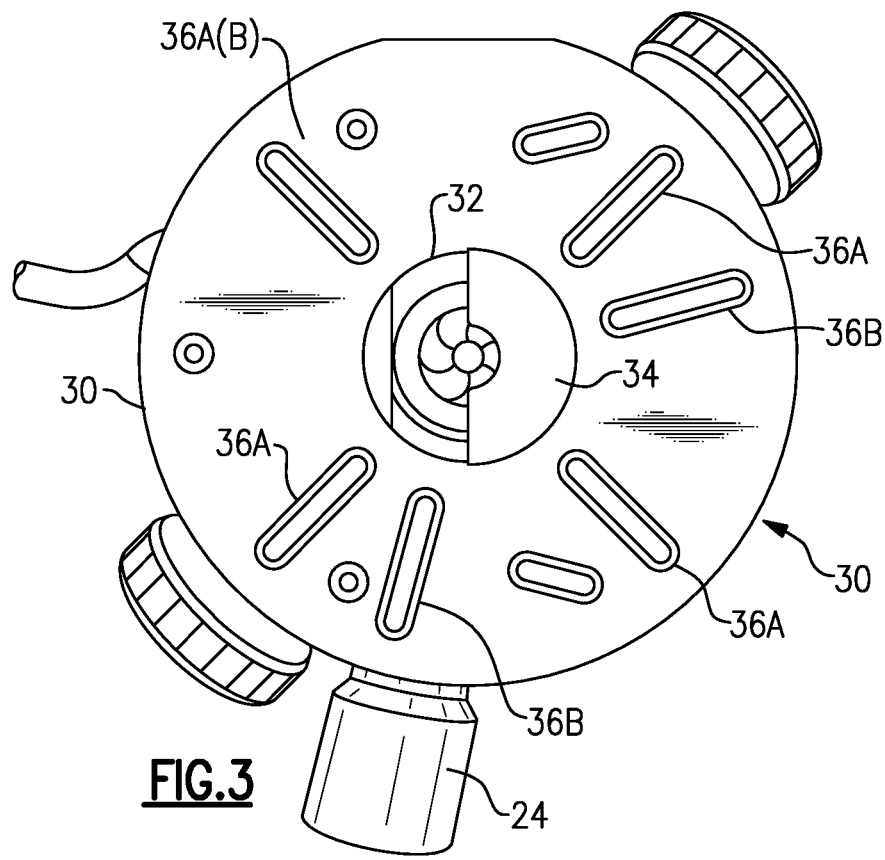
FIG. 3 is another view of the underside of the router hood mounted on the router, illustrating a favorable arrangement of a hole and slot pattern for universal mounting.

A base plate 30 of the router hood tool 20, here in the form of a disk of a tough plastic, is fastened to the lower surface of the router base 12. The base plate 30 instead could be metal or wood composite. The lower side of the base plate 30 is shown in FIG. 3. Preferably, the material used for the router hood tool 20 is a clear plastic, so the user can see the mounting holes of the router during assembly, and can see the operation of the router bit and of the dust extraction process during use. The base plate has a central opening 32 surrounding the axis of the router. A chip chute 34 is positioned in this opening 32. The chip chute is generally in the shape of an inverted half-dome, and can rotate freely about the router axis so as to follow the edge of the workpiece in a routing operation. The chip chute 34 can be removed for plunge-cut work on interior parts of the workpiece that are away from its edges. As will be seen later the chip chute 34 can be replaced with a longer chip chute when needed.

There are multiple screw openings 36 in the base plate 30 so that some combination of these openings will accommodate corresponding screw openings on the router base 12 for most if not all available makes and models of routers.

An instruction sheet with the router hood tool 20 indicates which openings or slots to use to accommodate to the various brands and models of routers. The mounting chart for the base plate 30 onto each given model is also available on line from the manufacturer's web site. Also, molded-in or applied indicia on the base plate 30 (letters, numbers, or symbols) assist the user in aligning the base plate to the router base.

Details of the base plate 30, dome 22 and cuff 24 of this embodiment are shown in more detail in FIGS. 4A, 4B, 4C and 4D, which are a top plan, perspective, side elevation, and front elevation, respectively. The dome 22 is mounted into the central opening of the base plate 30 and can rotate about the axis of the router, either freely or in an indexing fashion, so that the dome can be properly aligned with one of the vents or ports 14. The dome has round opening at its top to accommodate the associated router bit and drive shaft. At the inside of the round opening is an arcuate flange 25 to channel air flow and dust from the router bit towards the side of the dome that connects with the discharge cuff 24, and the flange 25 prevents the particulates from exhausting out the top of the dome into the router or into the ambient. Also as shown here there a number of different mounting holes among the plurality of screw openings 36, which include a number of radial elongated mounting slots, here with four radially elongated openings 36A that are angularly spaced at 90 degrees, and three radially elongated slots 36B that are spaced at 120 degrees. A number of other mounting openings are also present. Some combination of these slots and other openings will accommodate the base of nearly any make and model of router. The cuff 24 is detachable from the dome 22 and includes a cuff connector 38 that snaps in place on corresponding structure on the dome 22. Details of this are shown in FIGS. 8A to 8D to be discussed later. This construction allow the cuff 24 to be inserted through the router vent 14 to connect it to the dome 22 after the base plate 30 has been properly bolted to the router base 12.

FIG. 5 is an assembly view showing the relationships of the various components, namely the lower and upper disk portion of the base plate 30, dome 22, and cuff 24, as well as the two interchangeable chip chutes 34, 134 (See FIGS. 11A to 11D and 12A to 12D).

Figure 6A:
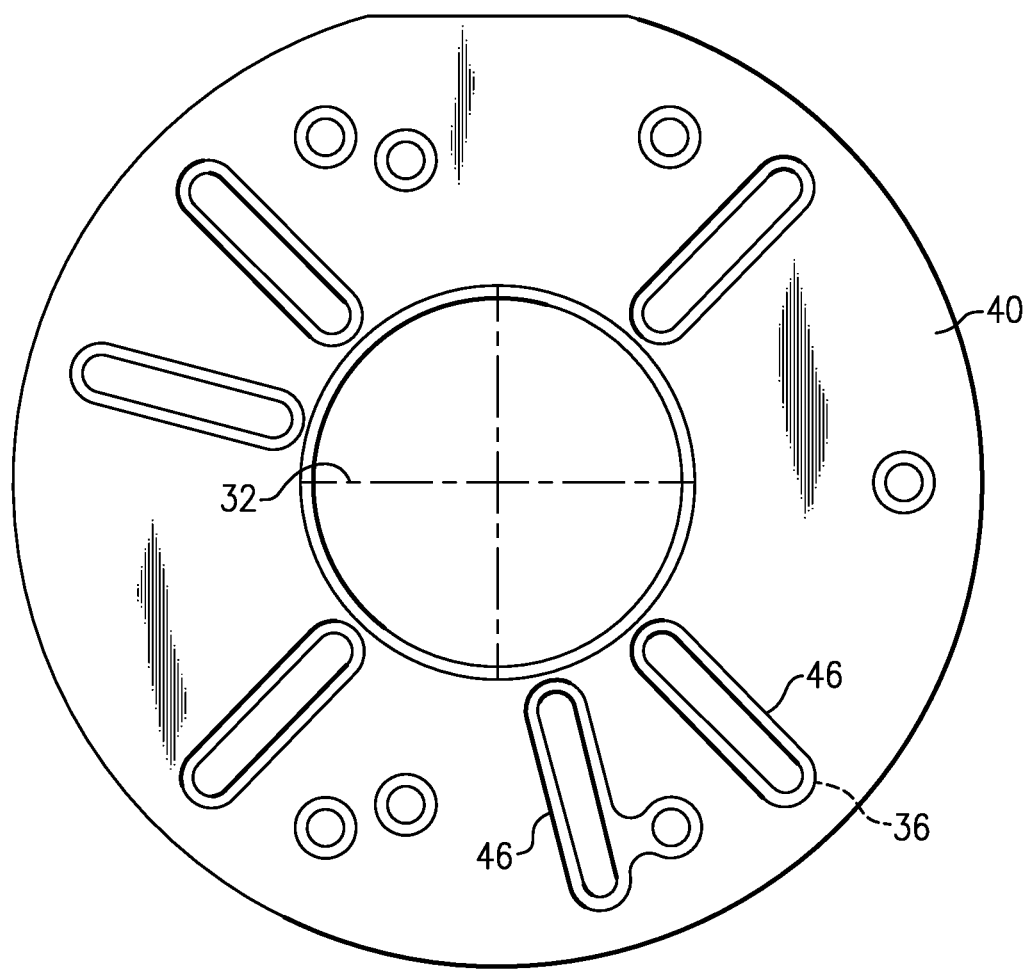
FIGS. 6A and 6B are a plan view and elevation of the lower router disk half of this embodiment.
Figure 6B:
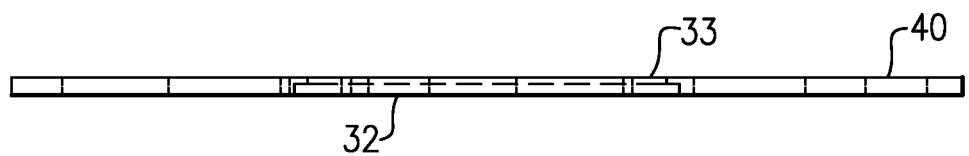
Figure 7A:
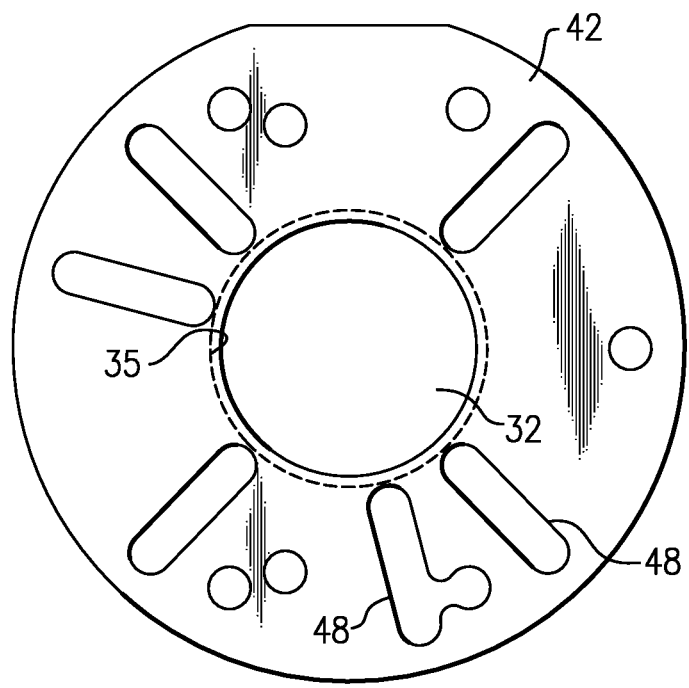
FIGS. 7A and 7B are a plan view and elevation of the upper router disk half of this embodiment.
Figure 7B:
Figure 9B:
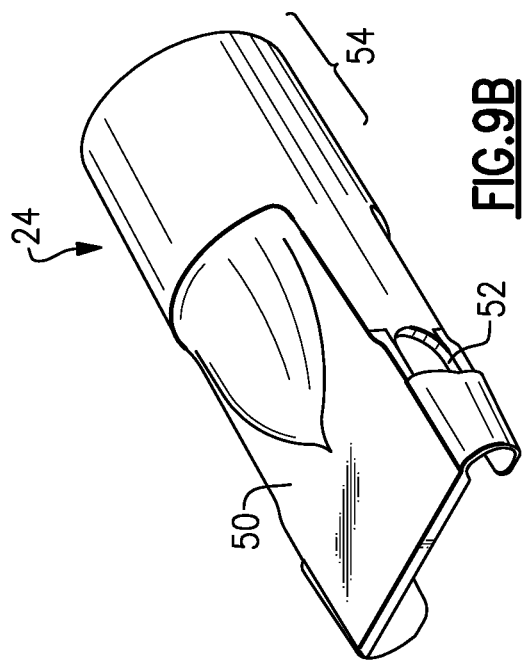
FIGS. 9A, 9B, 9C, and 9D are a top plan, perspective, proximal elevation and side elevation of the dust hood connector cuff of this embodiment.
Figure 9D:
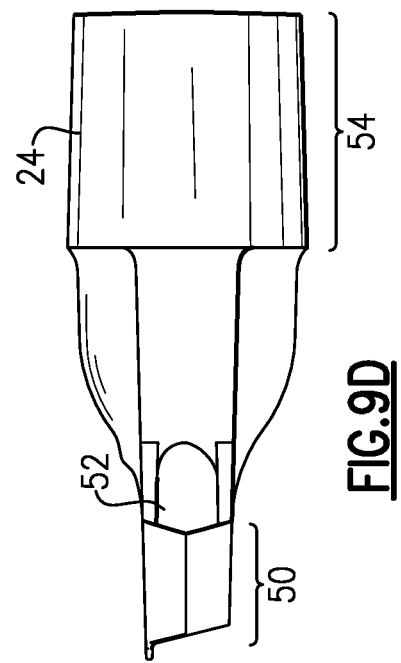
Figure 9A:
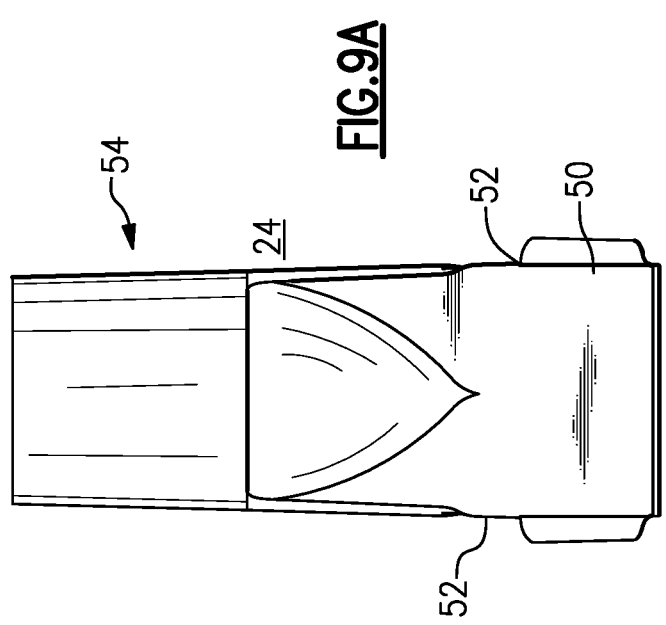
Figure 9C:
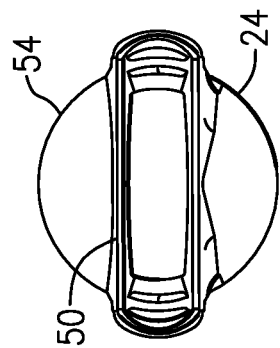

As also shown here, the base plate 30 is formed of a lower disk 40 (FIGS. 6A, 6B) and an upper disk 42 (FIGS. 7A and 7B) that are joined together with the dome 22 held in place between the two. The lower disk 40 has a number of embossments 44 at the positions of holes and slots that are positioned to mate with openings 46 in the upper disk 40. The lower and upper disk capture the dome 22 to permit it to swivel, as will be discussed. The lower disk 40 and the upper disk 40 each have an annular flange 33, 35 along the circumference of the central opening, and when the two disks are joined, these flanges define an annular channel for a radially projecting ridge of the dome. This retains the dome 22 but permits the dome to swivel about so that the exit vent 47 can be properly aligned. In the preferred embodiment, the router hood assembly is held together by the screw fasteners that pass through the base plate 30 into the base of the router. Alternatively, the disks 40, 42 can be joined with adhesives or with molded-in latching structures.

FIGS. 8A, 8B, 8C and 8D are a plan view, a perspective, a front elevation and a side elevation, respectively, of the dome 22 and its associated elements that connect with the cuff 24. The dome 22 has a central opening 23 at the router axis and the router bit extends down through this opening 23. This opening also admits air to carry process dust to the dust extraction equipment. Here the dome has an exit duct 47 at one side which a pair of cuff retainer spring arms 48, 48 that snap into place into mating female structure in a flattened section 50 of a cuff 24 where the spring arms 48 mating structure on the cuff 24. The cuff 24 has a flattened section 50 which fits within the router vent, and has a notch or hollow 52 on each side to receive ears of the spring arms 48 (See FIGS. 9A, 9B, 9C and 9D). The dome 22 has a depending arcuate flange 25 extending down from the dome top opening 23. This creates an annular channel to direct air flow from the router bit towards the exit vent 47, preventing particulates and dust from exiting the top opening 23. There is an annular or arcuate rib 37 that extends around the wide part of the dome 22 and serves to fit into the circular or annular groove or channel formed between the upper and lower disks 42, 40 at the central opening 32 of the base plate 30. This structure holds the dome 22 in place on the base plate, i.e., captured between the annular flanges of the upper and lower disks 40, 42, but also permits it to travel freely in the annular channel defined between the two flanges, so that the dome can rotate to align exit duct 47 of the cuff 24 with the associated vent or port 14 of the router.

The hose cuff 50 has a fitting 54 at its end away from the dome, to receive the hose connect of a vacuum hose. In this embodiment, the inner part of the fitting 54 serves as a female fitting to receive a 1.25 inch hose connect, while the outer part of the fitting serves as a male fitting to receive a 1.5 inch hose connect. In the present embodiment, the cuff 24 is of one-piece construction, but in alternative embodiments the cuff may be of two-piece, snap-together construction which can hold the hose cuff in place but permit rotation, or may be include a quick disconnect hose fitting, so that the portion that juts out from the router will not break or become damaged in transport.

Figure 10:
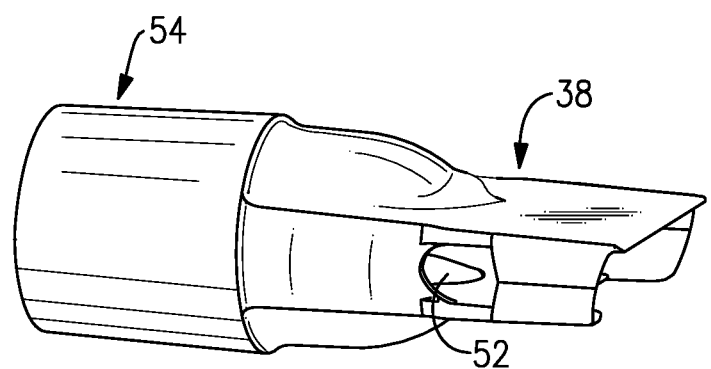
FIG. 10 (on the sheet with FIG. 3) is a side view showing the cuff with a vacuum hose connector.
Figure 4B:
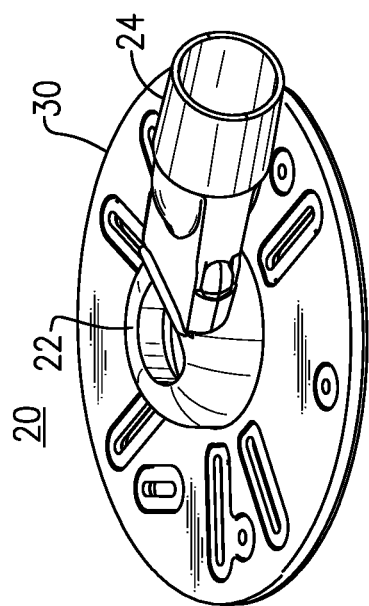
FIGS. 4A, 4B, 4C and 4D are a top plan, perspective, side elevation and proximal elevation of the router hood of this embodiment.
Figure 4D:
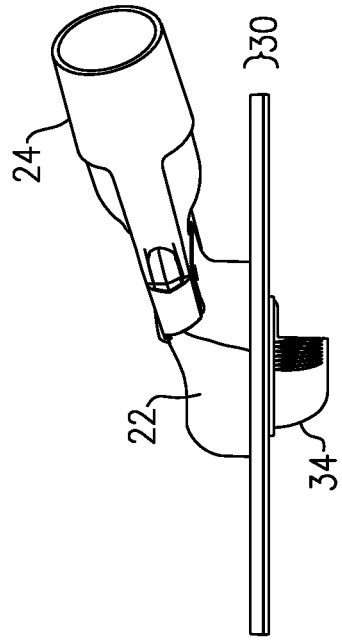
Figure 4A:
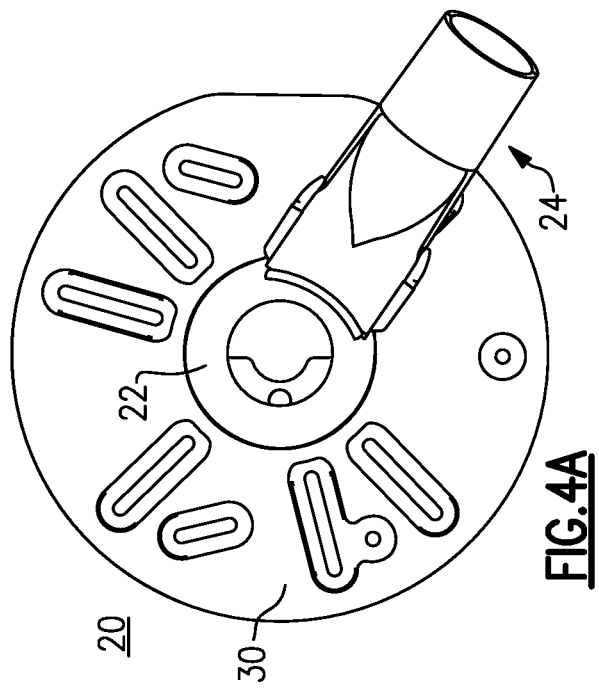
Figure 4C:
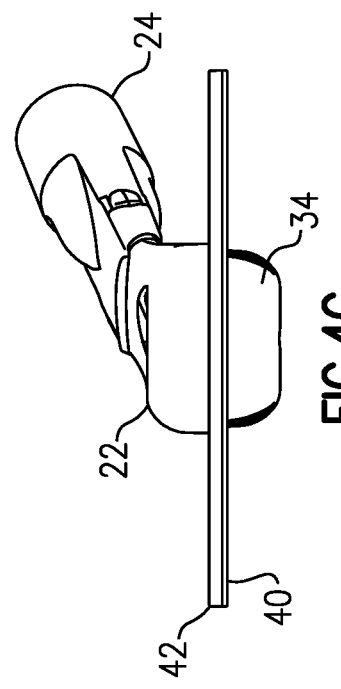

FIG. 10 shows the hose 26 and cuff 24 as assembled.

Figure 12B:
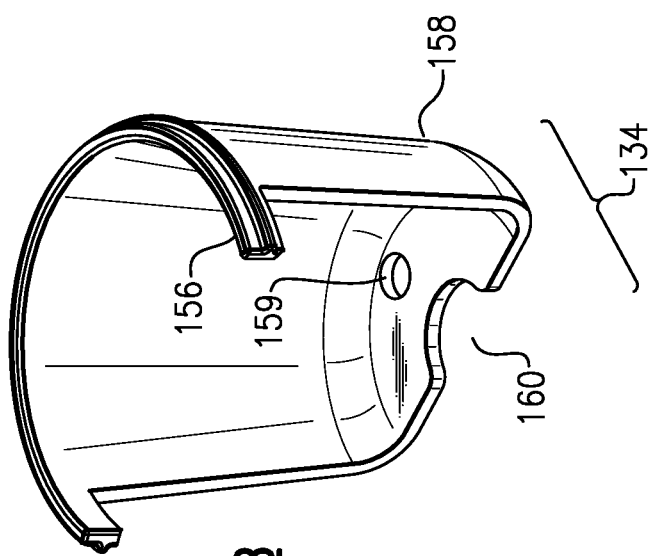
FIGS. 12A, 12B, 12C and 12D are a top plan view, perspective, first side elevation and second side elevation of the large chip chute or deep chip cover of this embodiment.
Figure 12D:
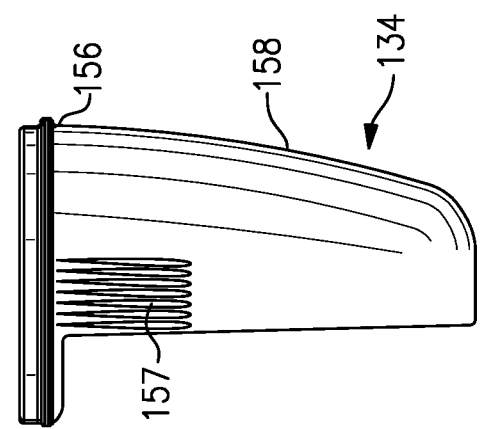
Figure 12A:
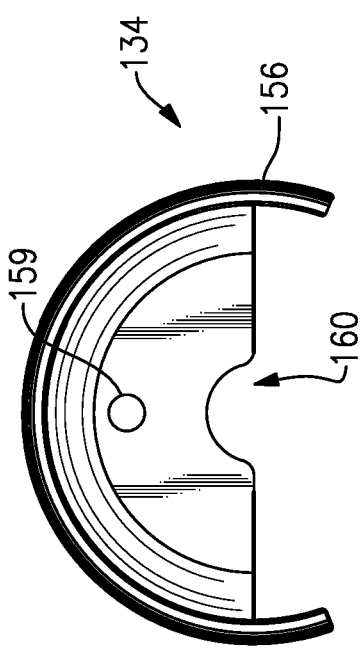
Figure 12C:
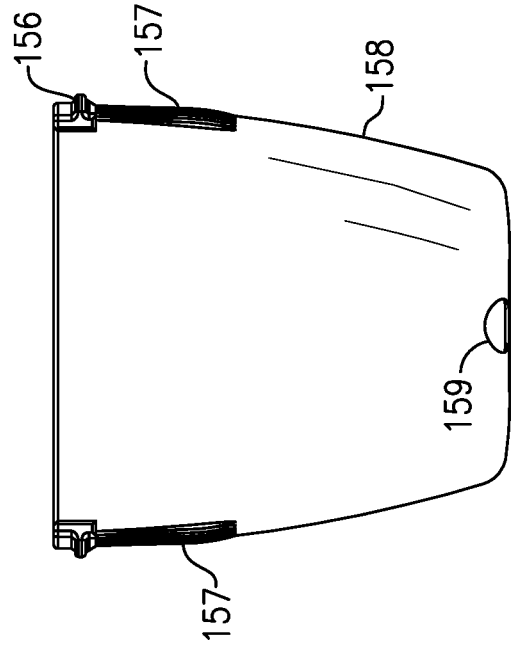

The small chip chute 34 of this embodiment is shown as a plan view in FIG. 11A to 11D. There is an arcuate retainer 56 formed at a top edge of a main half-dome scoop or chip chute body 58. The retainer 56 extends past vertical edges of the body 58 so that its arc is over 180 degrees, here about 220 degrees, leaving a gap of about 140 degrees. The retainer 56 has an outer rib to engage in the annular recess in the base plate central opening 32. This configuration allows the chip chute 34 to rotate around the axis of the router and router bit when the router is in use, so that the chute covers the side of the router away from the work piece. This configuration with free ends of the annular retainer extending beyond the edges of the chute body also allows the chip chute 34 to be removed, e.g., for plunge routing work, or to be replaced with a different chip chute, such as the larger chip chute 134 as shown in FIGS. 12A to 12 D. Elements that correspond to like elements in the smaller chip chute of FIGS. 11A to 11D are identified with the same reference numbers but raised by 100, and are generally identical, except that the chip body 158 is somewhat taller, here 2-½ inches as compared with a height of about ⅞ inch for the small chip chute.

The chip chute 34 or 134 serves two purposes: in addition to directing the flow of particulates to the dust extraction equipment, the chip chute also serves as a protection device, keeping chips from striking the user's hands, face or elsewhere. These can be smaller or larger, or in between sizes for different routing applications, e.g., ½ inch to 3 inches. The chip chutes or dust chutes can be removed by hand in only a few seconds, but gripping it on both sides, with assistance of the grip grooves.

The chip chutes each have a round (semi-circular) cutout 60 or 160 at the machine axis on the bottom wall of the half-dome shaped body 58 or 158, to accommodate the router bit. A small hole 59 or 159 is shown also in the chip chute to allow the chip chute to hang on a nail or hook when it is not being used.

The design of this router hood tool 10 allows for installation with only standard tools such as wrenches or screwdrivers, and without need to alter or modify the router itself. Grip grooves 57, 157 are shown near the vertical edge of the chute body to assist the user in squeezing the sides of the chip chute for insertion or removal. The chip chutes can be installed or removed by jently squeezing at the grip grooves 57 or 157.

The upper dome 22 of the router hood together with the lower chip chute 34 or 134 channel the air flow past the router and into the vacuum hose 26 to ensure that the air flow with the entrained dust and chips proceed out the hood and through the vacuum hose to the connected hose of the associated shop vacuum or other dust extractor, and the process dust and chips do not spray out into the ambient air. The disk or mounting plate 30 blocks any path to the far side opening or port which may otherwise provide a path for dust to escape collection. This also ensures the air flow is up from the vicinity of the router bit and out into the dome of the hood tool, and thence out to the associated vacuum cleaner or dust extractor.

The universal-fit vacuum assisted router hood tool 10 can have other modular attachments that can be combined, as needed. This could include a lighting option. Also, a smaller molded plastic dust hood can be used for trim routers.

Preferably, the dome, base plate, and chip chute can all be formed of a clear plastic material. This allows the user a clear view of the router bit and the workpiece through the router's vent or port 14, with or without optional illumination of the router bit, which allows the user to view and monitor the cutting action being completed through the router port. The cuff connector, cuff and even vacuum hose may be formed of transparent or clear (anti-static) material also, to permit the user to view the flow of the entrained dust and other particles going to the dust extraction equipment.

The unit can be easily assembled onto the user's router. First, the user unscrews the three or four screws from the existing base plate on the router, and sets the screws aside for installation of the router hood base plate. The user then places the lower disk on a flat surface and places the dome over the center hole of the lower disk. The second or upper disk is placed over the dome so the prongs or spring arms pass through the center hole, and the upper disk is rotated as necessary so that the holes and grooves line up with the corresponding ones in the other disk such that the two disks are aligned. Then the partly assembled router hood is placed onto the base of the router so that the dome goes inside the chamber of the router. The base plate, formed of the two disks, is then rotated so that the holes or slots align with the appropriate screw holes of the router. There are letters or other indicia on the base plate to assist in matching the base plate of the router hood to the hole pattern of the user's particular model router. Then the three or four screws that had been removed earlier are used to mount the router hood to the router, and these can be tightened with a screwdriver.

The chip chute can be inserted into the base plate, by gently squeezing the sides and fitting the top of the chip chute into the annular cavity at the inside rim of the base plate. When the chip chute is properly seated, it will rotate freely. Then with the hose attached, the cuff can be clipped onto the spring arms of the dome, and the user is now ready for dust-free router work.

While the router dust hood of this invention has been described in detail in respect to a preferred embodiment, is should be appreciated that the invention is not limited only to that embodiment, but that many modifications and variations would present themselves to persons skilled in the art without departing from the principles of the invention.

What is claimed is:

1. A universal-fit vacuum assisted router hood tool comprising a generally planar base plate adapted to mount to a flat base of a router in which a router bit extends through a center opening of the router base, the base plate having a central opening adapted to center on the axis of the router and associated router bit; a dust collection dome that is rotationally positioned in an annular groove in the central opening with a top opening at the axis of the router and configured for free rotation of the dust collection dome about the router axis, and a cuff connector extending from the dust collection dome to a removably connected hose cuff adapted to connect with a dust extraction device, such that the hose cuff can be positioned to project from the router by rotating said dome.

2. The router hood tool according to claim 1 comprising one or more dust chutes fitted into the annular groove of said central opening and configured so as to cover an exposed side of said router bit, and adapted to be free to rotate about the axis of the router.

3. The router hood tool according to claim 2 wherein said at least one dust chute is in the form of a half-dome.

4. The router hood tool according to claim 2 wherein said one or more dust chutes include a pair of interchangeable dust chutes, with a small dust chute having a height of about ⅞ inch, and a large dust chute having a having a height of about 2½ inch.

5. The router hood tool according to claim 2 wherein each said dust chute includes a hang hole positioned at a lower end thereof.

6. A universal-fit vacuum assisted router hood tool comprising a generally planar base plate adapted to mount to a flat base of a router in which a router bit extends through a center opening of the router base, the base plate having a central opening adapted to center on the axis of the router and associated router bit; a dust collection dome that is rotationally positioned in an annular groove in the central opening with a top opening at the axis of the router, and a cuff connector extending from the dust collection dome to a hose cuff adapted to connect with a dust extraction device; further comprising one or more dust chutes fitted into the annular groove of said central opening and configured so as to cover an exposed side of said router bit, and adapted to be free to rotate about the axis of the router; and wherein each said dust chute is adapted to be inserted into or removed from the router base by gripping the dust chute at opposed side edges thereof and at locations of finger grip grooves formed on the dust chute.

7. The router hood tool according to claim 6 wherein for each said dust chute said grip grooves are positioned at vertical side edges thereof.

8. The router hood tool according to claim 1 wherein said dome and said base plate are formed of a clear or transparent plastic material.

9. A universal-fit vacuum assisted router hood tool comprising a generally planar base plate adapted to mount to a flat base of a router in which a router bit extends through a center opening of the router base, the base plate having a central opening adapted to center on the axis of the router and associated router bit; a dust collection dome that is rotationally positioned in an annular groove in the central opening with a top opening at the axis of the router, and a cuff connector extending from the dust collection dome to a hose cuff adapted to connect with a dust extraction device; wherein said dust collection dome includes an annular flange depending from said central opening, and defining an arcuate channel leading to said cuff connector.

10. A universal-fit vacuum assisted router hood tool comprising a generally planar base plate adapted to mount to a flat base of a router in which a router bit extends through a center opening of the router base, the base plate having a central opening adapted to center on the axis of the router and associated router bit; a dust collection dome that is rotationally positioned in an annular groove in the central opening with a top opening at the axis of the router, and a cuff connector extending from the dust collection dome to a hose cuff adapted to connect with a dust extraction device; wherein said dome includes an exit duct that includes a pair of cuff retainer spring arms with retaining ears, and said cuff connector has a section with a pair of notches or hollows to receive said retaining ears of said spring arms.

11. The router hood according to claim 1 wherein said base plate includes a plurality of radial slots arranged about the central opening of the base plate, such that there are three of said slots arranged at an angular spacing of 120 degrees, and four of said slots arranged at an angular spacing of 90 degrees.

12. The router hood tool according to claim 1 wherein said base plate is formed of metal.

13. The router hood tool according to claim 1 wherein said base plate is formed of a wood composite.

14. A universal-fit vacuum assisted router hood tool comprising a generally planar base plate adapted to mount to a flat base of a router in which a router bit extends through a center opening of the router base along a vertical router axis, the base plate having a central opening adapted to center on the axis of the router and associated router bit and being formed of an upper disk and a lower disk each formed with a central opening with an annular flange such that the lower and upper disks joined together form an annular channel; a dust collection dome that is rotationally positioned in an annular groove in the central opening with a top opening at the axis of the router and the dome having an outer edge that is retained in said annular channel permitting the dome to swivel about the axis of the router, and a cuff connector extending from the dust collection dome to a hose cuff adapted to connect with a dust extraction device, such that the hose cuff can be positioned to project from the router by rotating said dome.

15. The router hood tool according to claim 14 wherein said cuff and said cuff connector are formed integrally.

16. A universal-fit vacuum assisted router hood tool comprising a generally planar base plate adapted to mount to a flat base of a router in which a router bit extends through a center opening of the router base, the base plate having a central opening adapted to center on the axis of the router and associated router bit; a dust collection dome that is rotationally positioned in an annular groove in the central opening with a top opening at the axis of the router, a cuff connector extending from the dust collection dome to a hose cuff adapted to connect with a dust extraction device, such that the hose cuff can be positioned to project from the router by rotating said dome, and one or more dust chutes adapted to be removably fitted into the annular groove of said central opening and configured so as to cover an exposed side of said router bit and adapted to be free to rotate about the axis of the router, each said dust chute being in the form of an inverted half-dome having an arcuate upper edge and first and second vertical side edges, and having an annular retainer formed at the upper edge with free ends that extend beyond the respective vertical edges, the annular retainer member being configured to be removably retained in said annular groove.

17. A universal-fit vacuum assisted router hood tool comprising a generally planar base plate adapted to mount to a flat base of a router in which a router bit extends through a center opening of the router base, the base plate having bolt holes therein positioned thereon according to any of a number of different standard configurations, the base plate having a central opening adapted to center on the axis of the router and associated router bit; a dust collection dome that is rotationally positioned in an annular groove in the central opening with a top opening at the axis of the router, and a cuff connector extending from the dust collection dome to a hose cuff adapted to connect with a dust extraction device; said base plate having a plurality of bolt openings therein of round shape and of elongated shape, and arranged in a configuration thereon so that at least some of the bolt openings align with bolt holes on the router plate of each of said standard configurations.

18. The router hood according to claim 17 wherein said configuration of bolt openings includes a plurality of radial slots arranged about the central opening of the base plate, such that there are three of said slots arranged at an angular spacing of 120 degrees, and four of said slots arranged at an angular spacing of 90 degrees.

\* \* \* \* \*